United States Patent [19]
Huang

[11] Patent Number: 5,352,025
[45] Date of Patent: Oct. 4, 1994

[54] METHOD FOR MANUFACTURING A HAIRBRUSH AND THE PRODUCT THEREOF

[76] Inventor: Jason Huang, No. 311, Sec. 1, Nan-Chien Rd., Lu-Chu Hsiang, Tao-Yuan Hsien, Taiwan

[21] Appl. No.: 34,903

[22] Filed: Mar. 22, 1993

[51] Int. Cl.5 .............................................. A46D 3/00
[52] U.S. Cl. ....................................... 300/21; 264/243
[58] Field of Search ........................ 300/21, 2; 264/243

[56] References Cited

U.S. PATENT DOCUMENTS

| | | | |
|---|---|---|---|
| 3,836,199 | 9/1974 | Blankschein | 300/21 |
| 4,635,313 | 1/1987 | Fassler et al. | 15/193 |
| 5,143,424 | 9/1992 | Boucherie | 300/2 |
| 5,158,342 | 10/1992 | Pai | 300/21 |

FOREIGN PATENT DOCUMENTS 1139811  11/1962  Fed. Rep. of Germany ...... 264/243

*Primary Examiner*—Mark Rosenbaum
*Assistant Examiner*—John M. Husar
*Attorney, Agent, or Firm*—Ladas & Parry

[57] ABSTRACT

A method for manufacturing a hairbrush and the product are disclosed. The method includes the steps of closing a mold; injecting thermoplastic plastic into a first mold cavity of the mold; opening the mold; ejecting a connecting rib member from a moving block of the mold by a predetermined distance; rotating the moving block 180 degrees; closing the mold; injecting thermoplastic plastic into the first mold cavity and a thermoplastic rubber into a second mold cavity of the mold; opening the mold; and removing the product and ejecting the connecting rib member from the moving block by a predetermined distance.

2 Claims, 9 Drawing Sheets

METHOD FOR MANUFACTURING A HAIRBRUSH AND THE PRODUCT THEREOF

BACKGROUND OF THE INVENTION

1. Field of the Invention

This invention relates to a method for manufacturing a hairbrush and the product thereof, more particularly to a method for manufacturing a high quality hairbrush.

2. Description of the Related Art

FIG. 1 shows a sectional view of a conventional flat-back brush which comprises a plurality of metal bristles that are set into a rubber piece 2. The periphery of the rubber piece 2 is adhered to a cavity periphery of the rubber piece 2 is adhered to a cavity of a flat base 3. The rubber piece 2 is slightly and outwardly convex in order to assure that the bristles 1 have a good elasticity when the user is brushing his/her hair. The assembly of such a hairbrush is troublesome and time-consuming because the bristles 1 must be individually and manually mounted to the rubber piece 2. To overcome these disadvantages, a flat-back hairbrush is manufactured by injection molding the bristles 1' and the base 2' connected to one end of the bristles 1', as shown in FIG. 2. Therefore, the hairbrush can be rapidly and automatically manufactured. However, since the bristles 1' and the base 2' are usually made of polypropylene or nylon, the elasticity of the bristles 1' is poor. The user may feel uncomfortable when brushing his/her hair. FIG. 3 shows a conventional vent brush which includes a plurality of bristles 4 and a base 5 in which each of the bristles 4 has an end buried therein. The conventional vent brush is made of polypropylene by means of an injection molding method. Therefore, the vent brush can be quickly and automatically manufactured. However, because of the good flowability of polypropylene which is necessary for injection molding, the vent brush has an unnecessary flash formed on the external surface thereof. In addition, the bristles 4 of the vent brush, which are made of polypropylene, have poor elasticity, thereby making the user uncomfortable.

SUMMARY OF THE INVENTION

It is therefore a main object of this invention to provide a method for manufacturing a hairbrush which has no flash and which has a good elasticity, thus making the user feel comfortable when he/she uses the hairbrush.

Accordingly, the method of this invention is used for manufacturing a hairbrush that has a plurality of bristles and a base into which the bristles are set, and comprises the steps of:

(1) closing a mold that includes a moving block and a fixed block, the moving block having a first bristle-forming cavity and a second bristle-forming cavity which is configured to be similar to the first bristle-forming cavity, the fixed block having a rib-forming cavity and a base-forming cavity, the first bristle-forming cavity being registerable with the rib-forming cavity to confine cooperatively a first mold cavity, and the second bristle-forming cavity being registerable with the base-forming cavity to confine cooperatively a second mold cavity;

(2) injecting a molten thermoplastic plastic into the first mold cavity to form a plurality of bristles, each of which has an end connected to a connecting rib member;

(3) opening the mold;

(4) ejecting the connecting rib member from the bottom of the first bristle-forming cavity by a predetermined distance;

(5) rotating the moving block 180 degrees relative to the fixed block in order to allow the second bristle-forming cavity to register with the rib-forming cavity and to allow the first bristle-forming cavity to register with the base-forming cavity;

(6) closing the mold in order to allow the second bristle-forming cavity and the rib-forming cavity to confine cooperatively a third mold cavity which is configured to be similar to the first mold cavity and to allow the first bristle-forming cavity and the base-forming cavity to confine cooperatively a fourth mold cavity which is configured to be similar to the second mold cavity, the connecting rib member ejected from the first bristle-forming cavity being received in the base-forming cavity;

(7) injecting simultaneously a molten thermoplastic plastic into the third mold cavity and injecting a molten thermoplastic rubber into the fourth mold cavity in order to form a rubber base in which the connecting rib member is buried in and is adhered to;

(8) opening the mold and removing a first product, which is formed in the fourth mold cavity, from the mold, and ejecting the connecting rib member from the bottom of the second bristle-forming cavity by the predetermined distance;

(9) rotating the moving block 180 degree relative to the fixed block in order to allow the first and second bristle-forming cavities to register respectively with the rib-forming and base-forming cavities;

(10) closing the mold and injecting the molten thermoplastic plastic into the first mold cavity and injecting the molten thermoplastic rubber into the second mold cavity;

(11) opening the mold and removing a second product, which is formed in the second mold cavity, from the mold, and ejecting the connecting rib member from the bottom of the first bristle-forming cavity by the predetermined distance; and

(12) repeating the steps (5) to (11).

Other features and advantages of this invention will become apparent in the following detailed description of the preferred embodiments of this invention with reference to the accompanying drawings.

DETAILED DESCRIPTION OF THE PREFERRED EMBODIMENTS

Figure 1:
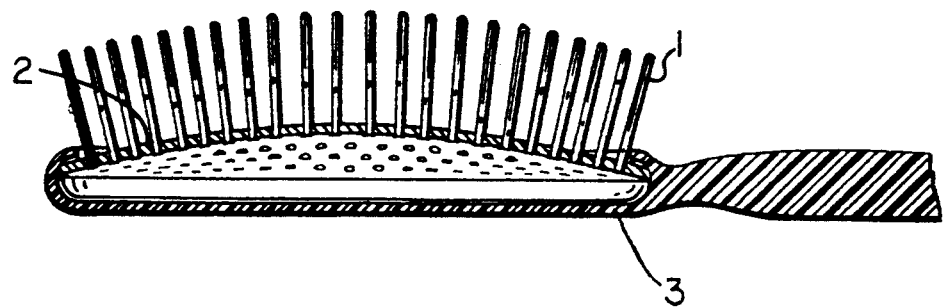
FIG. 1 is a sectional view of a conventional flat-back brush.
Figure 2:
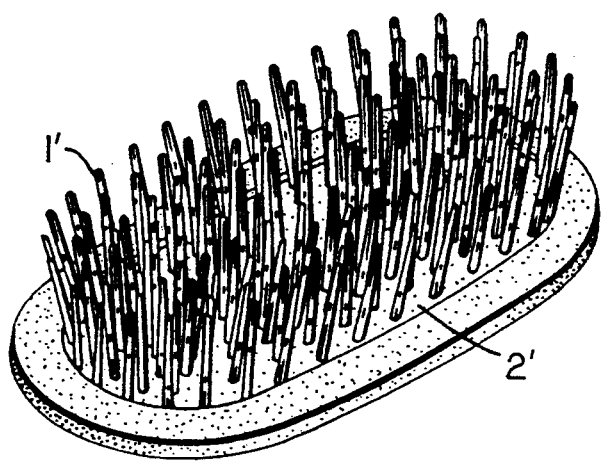
FIG. 2 is a sectional view of another conventional flat-back brush.
Figure 3:
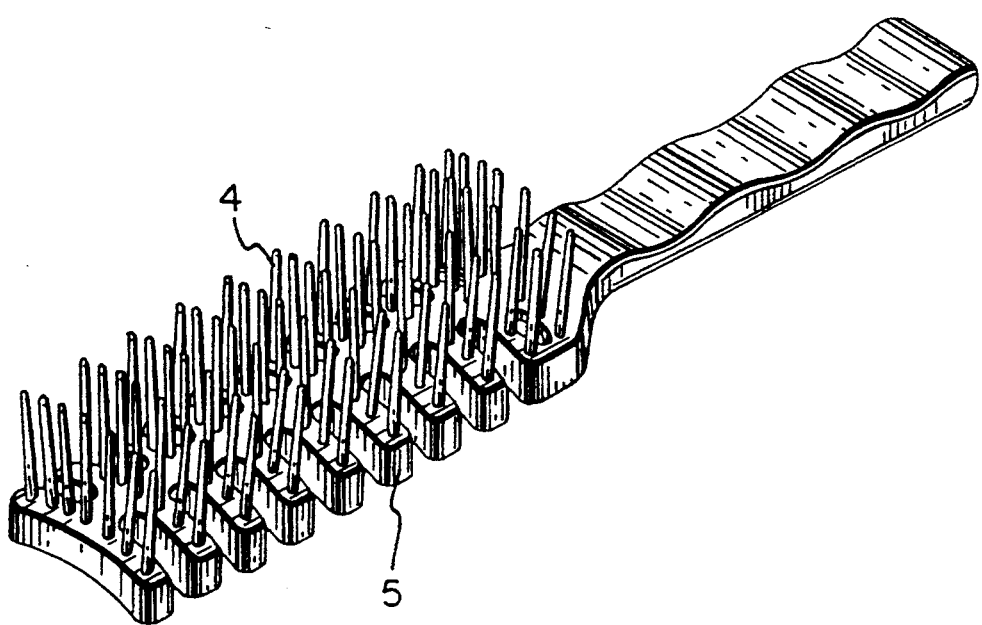
FIG. 3 is a sectional view of a conventional vent brush.
Figure 4:
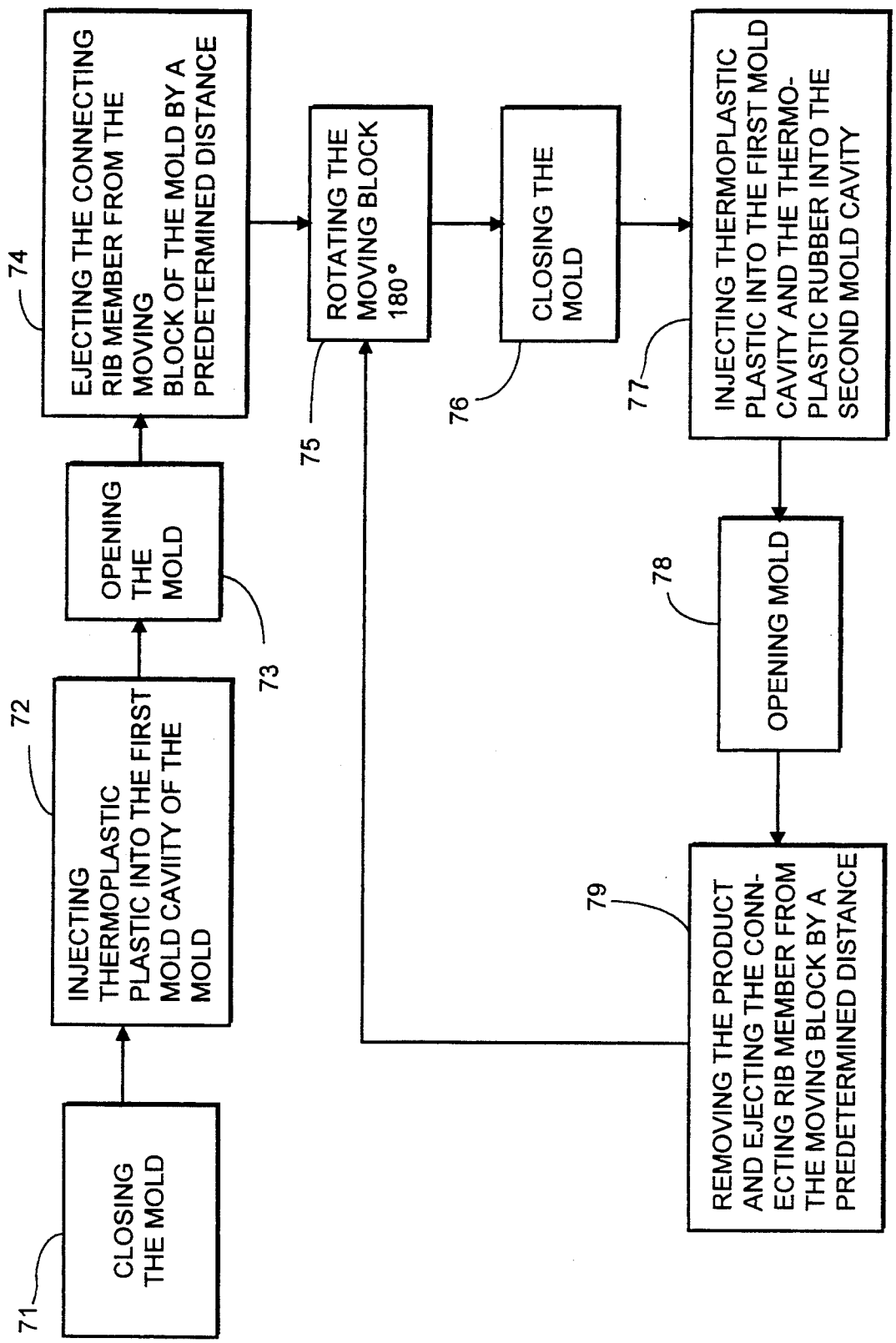
FIG. 4 is a flow diagram of a first preferred embodiment of a method for manufacturing a hairbrush of this invention.
Figure 5:
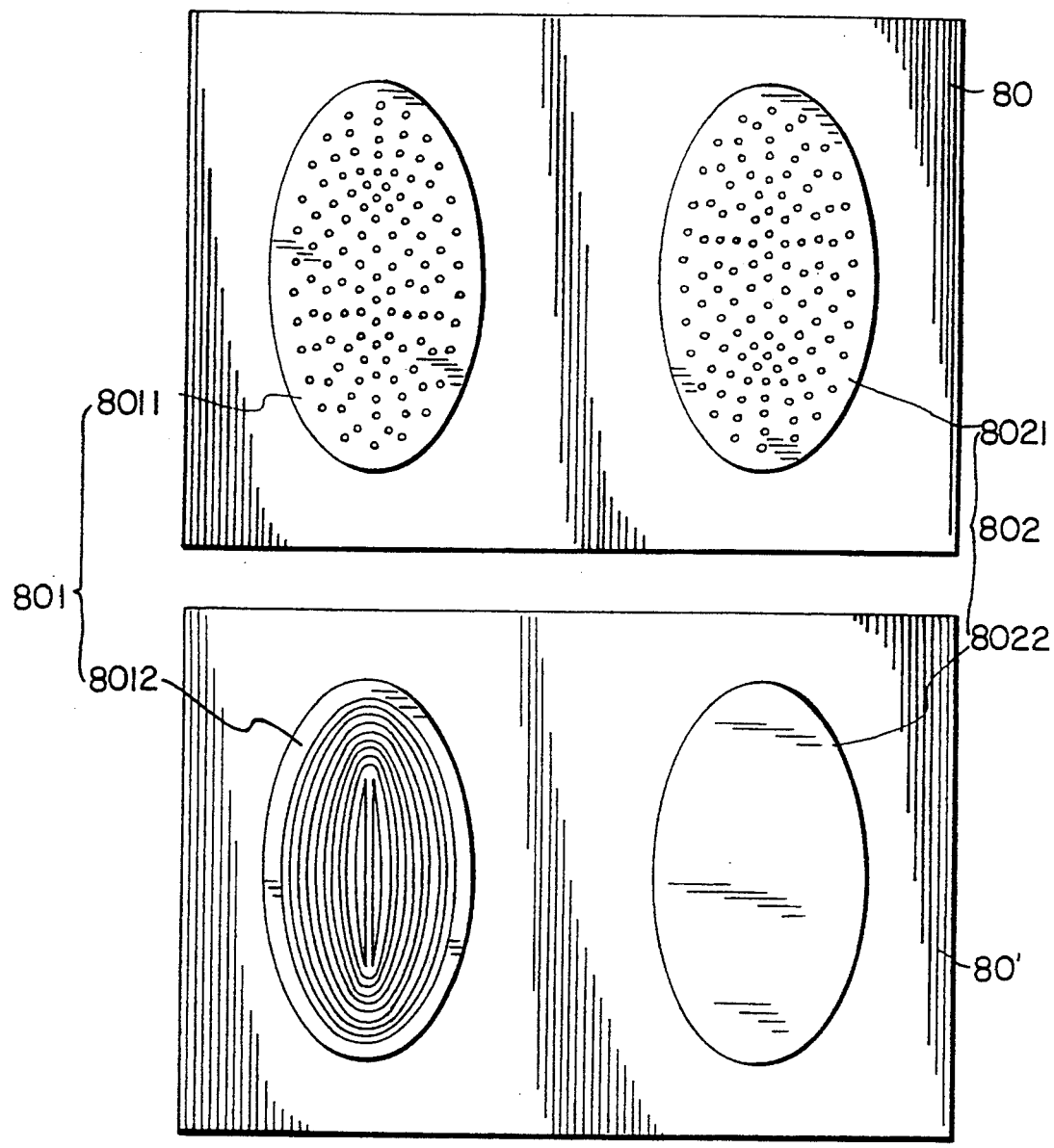
FIG. 5 is a schematic view of a mold which is utilized to manufacture the first preferred embodiment of the hairbrush of this invention.

FIG. 4 shows a flow diagram of a first preferred embodiment of a method for manufacturing a hairbrush of this invention. The method comprises the steps of closing a mold that includes a moving block 80 and a fixed block 80', as shown in block 71. The moving block 80 has a first bristle-forming cavity 8011 and a second bristle-forming cavity 8021 which is configured to be similar to the first bristle-forming cavity 8011, as best illustrated in FIG. 5. The fixed block 80' has a rib-forming cavity 8012 and a base-forming cavity 8022. The first bristle-forming cavity 8011 registers with the rib-forming cavity 8012, thus confining cooperatively a first mold cavity 801. The second bristle-forming cavity 8021 registers with the base-forming cavity 8022, thus confining cooperatively a second mold cavity 802.

Figure 8:
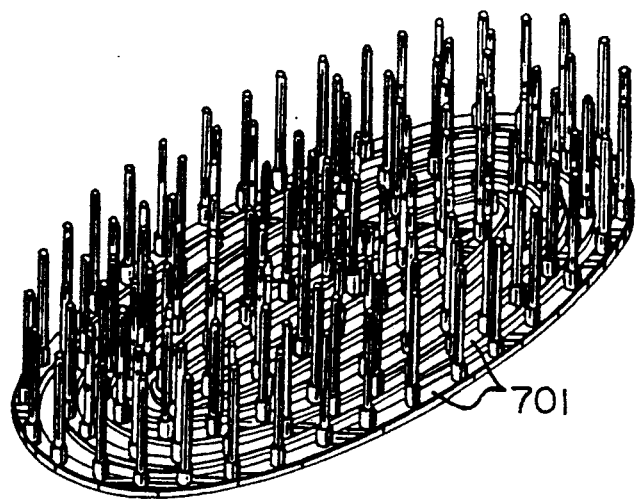
FIG. 8 is a perspective view of a first preferred embodiment of the bristles which are connected to a connecting rib member of this invention.

A molten thermoplastic plastic is injected into the first mold cavity 801 via a first injection spout 60 (see FIG. 6) in order to form a plurality of bristles 70 and a connecting rib member 701 connected to each end of the bristles 70, as shown in block 72. Preferably, the thermoplastic plastic is nylon. The connecting rib member 701 includes a plurality of concentric elliptical ribs connected to the bristles 70, as best illustrated in FIG. 8.

Figure 6:
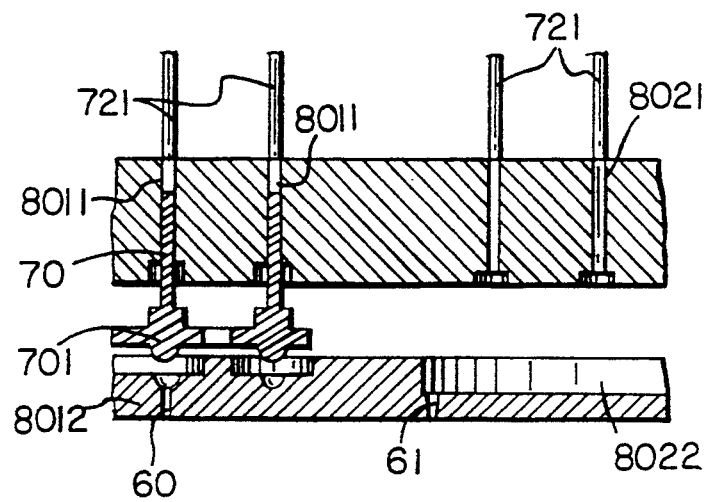
FIG. 6 is a fragmentary sectional schematic view illustrating the mold of the first embodiment being opened and the connecting rib member being ejected from the moving block of the mold by a predetermined distance.

The mold is then opened, as shown in block 73 and the connecting rib member 701 is ejected from the bottom of the first bristle-forming cavity 8011 by a predetermined distance, as shown in block 74 and best illustrated in FIG. 6. The connecting rib member 702 is ejected by means of the ejecting pins 721 of an ejector which is mounted behind the moving block 80. Preferably, the predetermined distance is 3 mm.

The moving block 80 is rotated 180 degrees relative to the fixed block 80', as shown in block 75, in order to allow the second bristle-forming cavity 8021 to register with the rib-forming cavity 8012 and to allow the first bristle-forming cavity 8011 to register with the base-forming cavity 8022.

Figure 7:
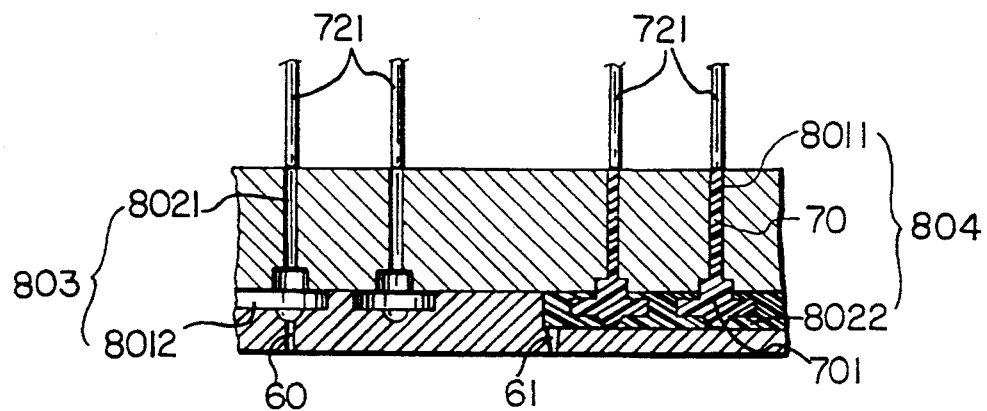
FIG. 7 is a fragmentary sectional schematic view illustrating the moving block of the mold of the first embodiment being rotated 180 degrees and the mold being closed afterward.

The mold is then closed, as shown in block 76, in order to allow the second bristle-forming cavity 8021 and the rib-forming cavity 8012 to confine cooperatively a third mold cavity 803 which is configured to be similar to the first mold cavity 801 and to allow the first bristle-forming cavity 8011 and the base-forming cavity 8022 to confine cooperatively a fourth mold cavity 804 which is configured to be similar to the second mold cavity 802. The connecting rib member 701, which was ejected from the first bristle-forming cavity, is received in the base-forming cavity 8022, as best illustrated in FIG. 7.

Figure 9:
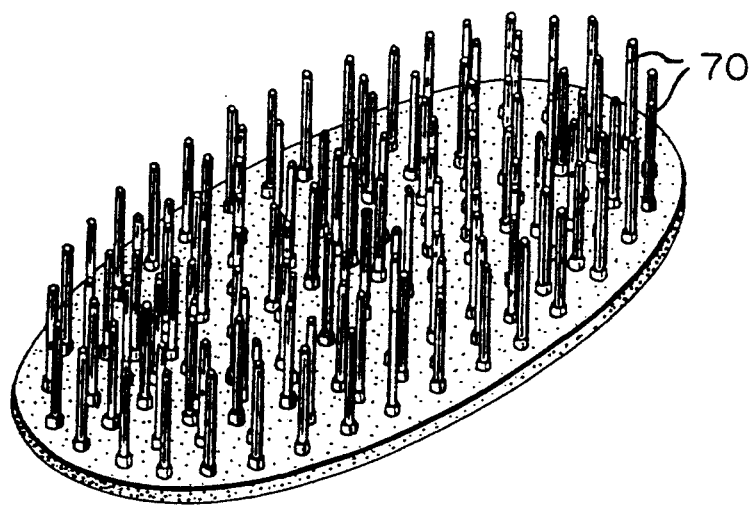
FIG. 9 is a perspective view of the first embodiment of the connecting rib member which is buried in a rubber base of the hairbrush of this invention.
Figure 10:
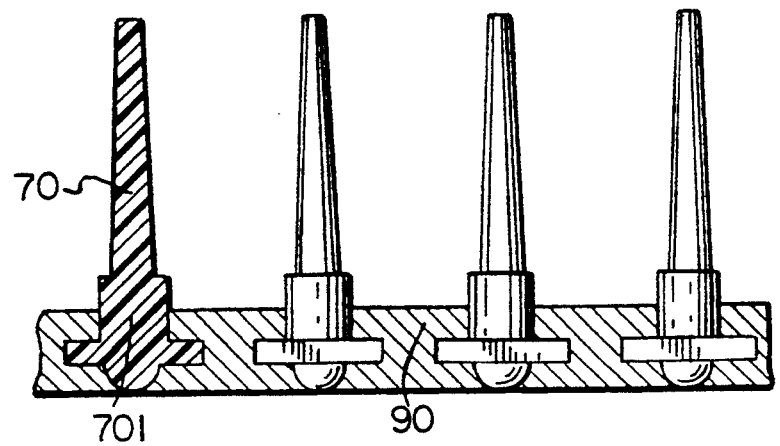
FIG. 10 is a fragmentary sectional view of the bristles with the connecting rib member and the rubber base of this invention.

Simultaneously, as shown in block 77, the molten thermoplastic plastic, i.e. nylon, is injected into the third mold cavity 803 via the first injection spout 60 and a molten thermoplastic rubber is injected into the fourth mold cavity 804 via a second injection spout 61 in order to form a rubber base 90 in which the connecting rib member 701 is buried in and is adhered to, as best illustrated in FIGS. 9 and 10. Preferably, the thermoplastic rubber of the first preferred embodiment is a synthetic rubber consisting of styrene and butadiene.

Figure 11:
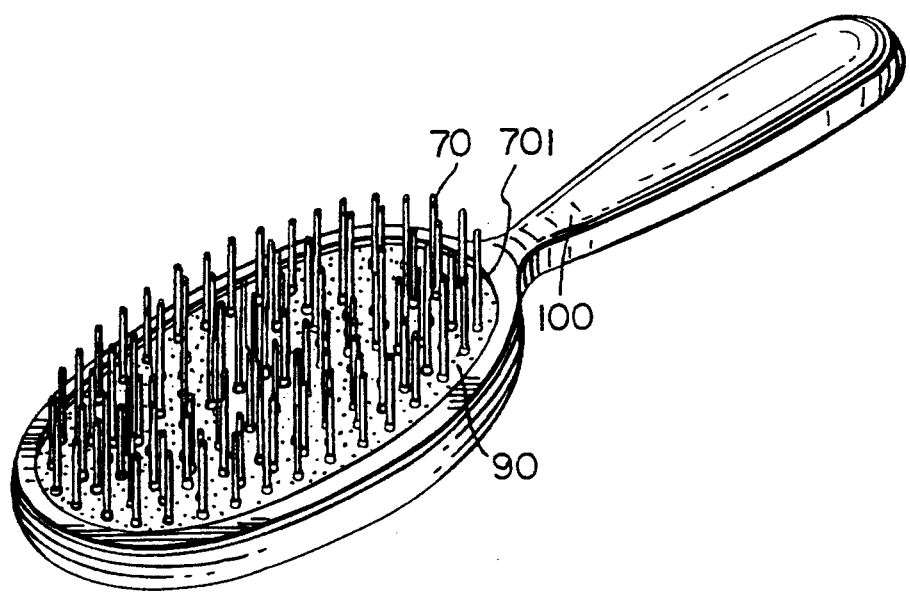
FIG. 11 is a perspective view of a first preferred embodiment of the hairbrush of this invention.

The mold is opened, as shown in block 78. A first product, which is formed in the fourth mold cavity, is removed from the mold, as best illustrated in FIG. 9. The connecting rib member 701 is ejected from the bottom of the second bristle-forming cavity 8021 by the predetermined distance, i.e., 3 mm, as shown in block 79. The rubber base 90 of the first product is mounted in a recess 101 of a handle 100 by means of a conventional method, as best illustrated in FIG. 11.

The moving block 80 is rotated 180 degrees relative to the fixed block 80' in order to allow the first and second bristle-forming cavities, 8011 and 8022, to register respectively with the rib-forming and base-forming cavities, 8012 and 8022.

The mold is closed and the molten thermoplastic plastic is injected into the first mold cavity and the molten thermoplastic rubber is injected into the second mold cavity in the aforementioned manner, as shown in blocks 76 and 77.

The mold is then opened. A second product, which is formed in the second mold cavity 802, is removed from the mold, as best illustrated in FIG. 9. The connecting rib member 701 is ejected from the bottom of the first bristle-forming cavity by the predetermined distance, i.e. 3 mm. The process steps in block 75 to block 79 can be repeated to manufacture continuously the product.

Figure 12:
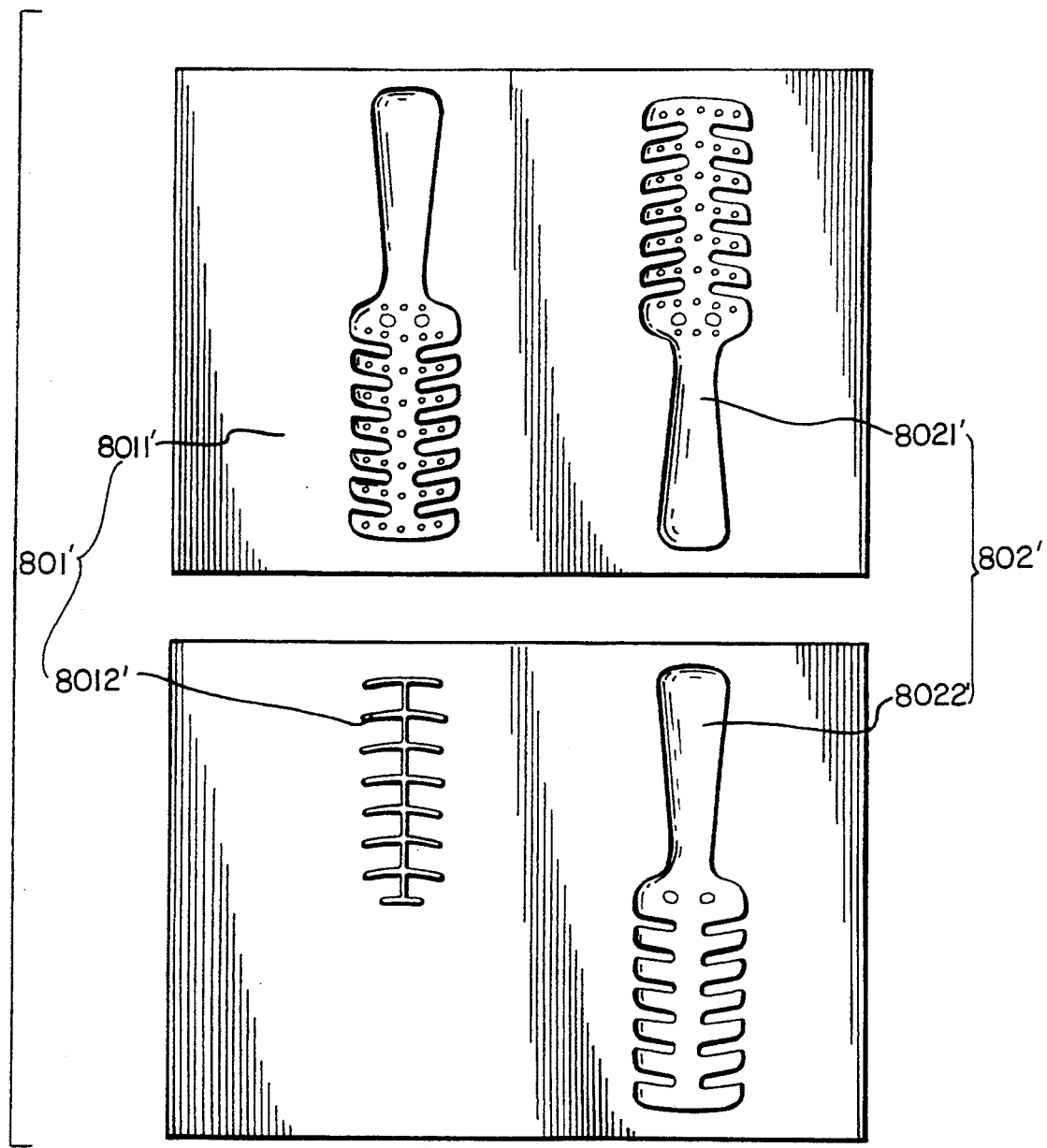
FIG. 12 is a schematic view of a mold which is utilized to manufacture a second preferred embodiment of the hairbrush of this invention.
Figure 13:
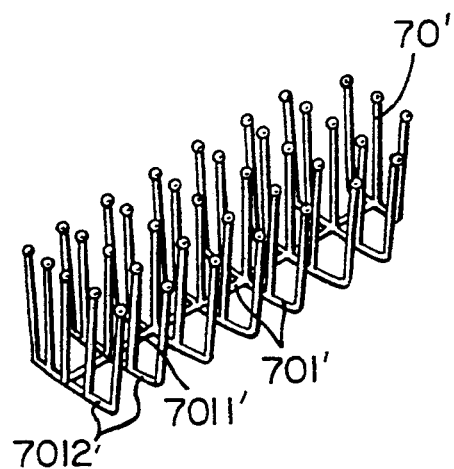
FIG. 13 is a perspective view of the second preferred embodiment of the bristles which are connected to a connecting rib member of this invention.
Figure 14:
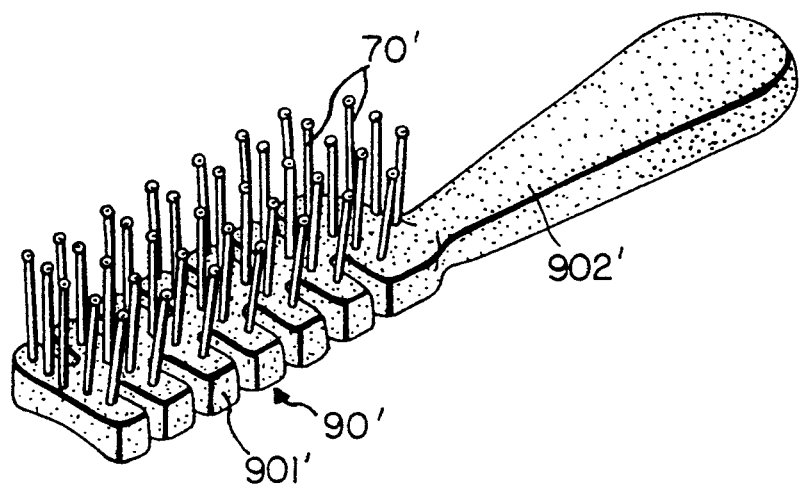
FIG. 14 is a perspective view of the second preferred embodiment of the connecting rib member which is buried in a rubber base of the hairbrush of this invention.

FIG. 12 shows a schematic view of a mold which is utilized to manufacture a second preferred embodiment of the hairbrush of this invention. In this embodiment, a vent brush is manufactured in a manner similar to that described in the first preferred embodiment. First and second bristle-forming cavities, 8011' and 8021', a rib-forming cavity 8012' and a base-forming cavity 8022' confine cooperatively a first mold cavity 801' and a second mold cavity 802'. The bristles 70' of the second embodiment are connected to the connecting rib member 701' in a manner similar to that described in the first preferred embodiment, as best illustrated in FIG. 13. The connecting rib member 701' includes a spine and a plurality of transverse ribs 7012' connected to the spine 7011'. A rubber base 90' includes a rib portion 901' which has a shape corresponding to the connecting rib member 701', and a handle portion 902' connected to the rib portion 901'. The connecting rib member 701' is buried in and is adhered to the rib portion 901' of the rubber base 90', as best illustrated in FIG. 14. Therefore, there is no need to mount the rubber base 90' on a handle. In this embodiment, the rubber base 90' is made of acrylonitrile-butadiene-styrene copolymer.

It is noted that the nylon which is used to form the hairbrush of this invention has a proper flowability and will not produce a flash on the product. In addition, because the rubber base of the hairbrush of this invention can be made of thermoplastic rubber material which is more elastic than thermoplastic plastic, the bristles of the hairbrush will be more elastic and therefore, the user may feel more comfortable when using the hairbrush manufactured according to the method of the present invention.

With this invention thus explained, it is apparent that numerous modifications and variations can be made without departing from the scope and spirit of this invention. It is therefore intended that this invention be limited only as indicated in the appended claims.

I claim:

1. A method for manufacturing a hairbrush which has a plurality of bristles and a base into which said bristles are set, said method comprising the steps of:
   (1) closing a mold that includes a moving block and a fixed block, said moving block having a first bristle-forming cavity and a second bristle-forming cavity which is configured to be similar to said first bristle-forming cavity, said fixed block having a rib-forming cavity and a base-forming cavity, said first bristle-forming cavity being registerable with said rib-forming cavity to confine cooperatively a first mold cavity, and said second bristle-forming cavity being registerable with said base-forming cavity to confine cooperatively a second mold cavity;
   (2) injecting a molten thermoplastic plastic into said first mold cavity to form a plurality of bristles, each of which has an end connected to a connecting rib member;
   (3) opening said mold;
   (4) ejecting said connecting rib member from the bottom of said first bristle-forming cavity by a predetermined distance;
   (5) rotating said moving block 180 degrees relative to said fixed block in order to allow said second bristle-forming cavity to register with said rib-forming cavity and to allow said first bristle-forming cavity to register with said base-forming cavity;
   (6) closing said mold in order to allow said second bristle-forming cavity and said rib-forming cavity to confine cooperatively a third mold cavity which is configured to be similar to said first mold cavity and to allow said first bristle-forming cavity and said base-forming cavity to confine cooperatively a fourth mold cavity which is configured to be similar to said second mold cavity, said connecting rib member ejected from said first bristle-forming cavity being received in said base-forming cavity;
   (7) injecting simultaneously a molten thermoplastic plastic into said third mold cavity and injecting a molten thermoplastic rubber into said fourth mold cavity in order to form a rubber base in which said connecting rib member is buried in and is adhered to;
   (8) opening said mold and removing a first product, which is formed in said fourth mold cavity, from said mold, and ejecting said connecting rib member from the bottom of said second bristle-forming cavity by said predetermined distance;
   (9) rotating said moving block 180 degree relative to said fixed block in order to allow said first and second bristle-forming cavities to register respectively with said rib-forming and base-forming cavities;
   (10) closing said mold and injecting said molten thermoplastic plastic into said first mold cavity and injecting said molten thermoplastic rubber into said second mold cavity;
   (11) opening said mold and removing a second product, which is formed in said second mold cavity, from said mold, and ejecting said connecting rib member from the bottom of said first bristle-forming cavity by said predetermined distance; and
   (12) repeating the steps (5) to (11).

2. A method for manufacturing a hairbrush as claimed in claim 1, wherein by said predetermined distance is 3 mm.

* * * * *